United States Patent
Henzmann et al.

(10) Patent No.: US 11,118,950 B2
(45) Date of Patent: Sep. 14, 2021

(54) ULTRASONIC FLOW METER

(71) Applicant: Siemens Schweiz AG, Zürich (CH)

(72) Inventors: Pascal Henzmann, Beinwil am See (CH); Thomas Siegrist, Küsnacht (CH)

(73) Assignee: SIEMENS SCHWEIZ AG, Zurich (CH)

( * ) Notice: Subject to any disclaimer, the term of this patent is extended or adjusted under 35 U.S.C. 154(b) by 147 days.

(21) Appl. No.: 16/606,564

(22) PCT Filed: Apr. 19, 2018

(86) PCT No.: PCT/EP2018/060016
§ 371 (c)(1),
(2) Date: Oct. 18, 2019

(87) PCT Pub. No.: WO2018/193030
PCT Pub. Date: Oct. 25, 2018

(65) Prior Publication Data
US 2021/0116277 A1    Apr. 22, 2021

(30) Foreign Application Priority Data
Apr. 20, 2017   (DE) ................. 10 2017 206 636.9

(51) Int. Cl.
*G01F 1/66*   (2006.01)
*G01F 15/18*  (2006.01)

(52) U.S. Cl.
CPC ............ *G01F 1/662* (2013.01); *G01F 15/185* (2013.01)

(58) Field of Classification Search
CPC .......... G01F 15/18; G01F 15/185; G01F 1/662
See application file for complete search history.

(56) References Cited

U.S. PATENT DOCUMENTS

| 4,541,436 A | 9/1985 | Hassler .......................... 128/660 |
| 5,277,070 A * | 1/1994 | Dorr ....................... G01F 1/667 73/861.27 |

(Continued)

FOREIGN PATENT DOCUMENTS

| CN | 201110776 Y * | 9/2008 | |
| CN | 204718761 | 10/2015 | .............. G01M 3/28 |

(Continued)

OTHER PUBLICATIONS

Search Report for International Application No. PCT/EP2018/060016, 10 pages, dated Sep. 3, 2018.
Office Action for DE 10 2017 206 636.9, 6 pages.

*Primary Examiner* — Francis C Gray
(74) *Attorney, Agent, or Firm* — Slayden Grubert Beard PLLC

(57) ABSTRACT

Various embodiments include a flow meter comprising: at least two sensors arranged at a set distance from one another; and a ring-shaped carrier configured to mount the flow meter between two tube segments of a conduit on a flange face of a tube section of the conduit. The at least two sensors are located at a respective free end of an extension extending from the ring-shaped carrier part. The extensions are aligned substantially perpendicularly to a plane defined by the carrier part. The at least two sensors define a signal path. The signal path comprises a component perpendicular to the plane defined by the carrier part.

7 Claims, 3 Drawing Sheets

(56) References Cited

U.S. PATENT DOCUMENTS

| | | | | |
|---|---|---|---|---|
| 6,330,831 B1 * | 12/2001 | Lynnworth | ............ | G01F 1/662 |
| | | | | 73/861.28 |
| 6,343,511 B1 | 2/2002 | Lynnworth | ............... | 73/861.18 |
| 2011/0162462 A1 * | 7/2011 | Allen | ..................... | G01F 1/662 |
| | | | | 73/861.18 |
| 2015/0268111 A1 * | 9/2015 | Hedtke | .............. | G01L 19/0007 |
| | | | | 73/700 |
| 2015/0377666 A1 * | 12/2015 | Rovner | ................. | G01F 1/586 |
| | | | | 73/861.12 |

FOREIGN PATENT DOCUMENTS

| | | | | |
|---|---|---|---|---|
| DE | 1915324 | 5/1965 | ............... | B41J 7/48 |
| DE | 20 2009 011 310 U1 | 9/2010 | ............... | G01F 1/66 |
| EP | 0152132 A1 | 8/1985 | ............... | G01F 1/66 |
| EP | 0202583 A1 | 11/1986 | ............ | A61B 10/00 |
| EP | 1887328 A1 | 2/2008 | ............... | G01F 1/66 |
| JP | 05060586 A  * | 3/1993 | | |
| WO | 2010/002432 A1 | 1/2010 | ............... | G01F 1/66 |

* cited by examiner

ULTRASONIC FLOW METER

CROSS-REFERENCE TO RELATED APPLICATIONS

This application is a U.S. National Stage Application of International Application No. PCT/EP2018/060016 filed Apr. 19, 2018, which designates the United States of America, and claims priority to DE Application No. 10 2017 206 636.9 filed Apr. 20, 2017, the contents of which are hereby incorporated by reference in their entirety.

TECHNICAL FIELD

The present disclosure relates to flow meters. Various embodiments may include flow meters delivering a measured value representing a flow speed of a medium flowing through a conduit.

BACKGROUND

In some meters, two ultrasonic sensors mounted on a measuring tube are located at a known distance from one another in an axial direction of the measuring tube. As a medium flows through the measuring tube, an ultrasonic signal emitted by one of the two ultrasonic sensors in the direction of the other ultrasonic sensor travels at least partially in the flow direction of the medium and an ultrasonic signal emitted in the opposite direction travels at least partially against the flow direction of the medium correspondingly. By determining the difference in propagation time between the ultrasonic signal traveling in the flow direction of the medium and the ultrasonic signal traveling against the flow direction of the medium, it is possible to determine the flow speed of the medium and, on the basis of the flow speed and the known cross-section of the measuring tube, to determine the volume flow through the measuring tube. Such a measuring tube is however unwieldy, adds to the expense of the flow meter and increases transport and storage costs.

WO 2010/002432 A1 describes an ultrasonic flow meter that is installed in a tube through which a fluid flows under pressure within the tube. The flow meter contains a signal processing unit and a tubular measuring body, which is exposed to the tube internal pressure and is substantially free of pressure differences from the inside to the outside of the tube. The tube has a hole through which the fluid flows. The flow meter further comprises an acoustic converter that is so arranged as to face upstream and downstream in the measuring body, this being exposed to a tube internal pressure and being free of any pressure difference from the inside to the outside of the tube and forming at least one acoustic path via the flow and being connected to the signal processing unit. Finally, the flow meter comprises a mechanism for mounting the meter body in the tube, said mechanism being exposed to a pressure difference from the inside to the outside of the tube.

CN204718761U describes a sensor arrangement in which a flow sensor is coupled to a conduit, specifically to a connection point of two conduit elements of the conduit, by means of a seal. In the seal is a hole to which a line is attached leading to the sensor. It is intended that any leakage will be detected by means of the sensor. The sensor is not suitable for specifying a flow speed of the medium flowing in the conduit.

DE 1 915 324 A1 discloses a magnetically inductive flow sensor which is installed in a section of a conduit. The flow sensor has the shape of a hollow cylinder and fits closely against the inner wall of the conduit. Inside the hollow cylinder are conductors or turns of a coil, which extend in a longitudinal direction of the hollow cylinder. The attachment of the flow sensor in the conduit is effected by means of an outward-directed flange which is formed thereon, said flange being clamped securely to a connection point of two conduit elements of the conduit, between two reciprocally facing flanges of the conduit elements.

SUMMARY

The teachings of the present disclosure describe flow meters which do not require a measuring tube and are nonetheless easy to use. For example, some embodiments include a flow meter (20) having at least two sensors arranged at a distance from one another (12, 14; 12a, 14a), wherein the flow meter (20) can be placed between two tube segments (26, 28) of a conduit (10) by means of a ring-shaped carrier part (24), wherein the ring-shaped carrier part (24) is intended to be mounted on a flange face of a tube section of the conduit (10), wherein the sensors (12, 14; 12a, 14a) are located in each case at a free end of an extension (30, 32; 30a, 32a) extending from the ring-shaped carrier part (24), wherein the extensions (30, 32; 30a, 32a) are aligned perpendicularly or at least substantially perpendicularly to a plane defined by the carrier part (24), and wherein two sensors (12, 14; 12a, 14a) in each case define a signal path (34, 34a) and the signal path (34, 34a) comprises a component (38) perpendicular to the plane defined by the carrier part (24).

In some embodiments, there are exactly two sensors (12, 14; 12a, 14a) and correspondingly two extensions (30, 32; 30a, 32a), each extension (30, 32; 30a, 32a) points in a different direction starting from the carrier part (24), or wherein in the case of two extensions (30, 32; 30a, 32a) which point in the same direction starting from the carrier part (24), the extensions (30, 32; 30a, 32a) are of different lengths.

In some embodiments, there are exactly four sensors (12, 14; 12a, 14a) and correspondingly four extensions (30, 32; 30a, 32a), two sensors (12, 14; 12a, 14a) in each case form a sensor pair and the extensions (30, 32; 30a, 32a) carrying these form an extension pair, and in each extension pair, either each extension (30, 32; 30a, 32a) points in a different direction starting from the carrier part (24) or, in the case of extensions (30, 32; 30a, 32a) pointing in the same direction, the extensions (30, 32; 30a, 32a) are of different lengths.

In some embodiments, the extensions (30, 32; 30a, 32a) are integrally connected to the carrier part (24).

In some embodiments, each sensor (12, 14; 12a, 14a) is embedded into the material of the extension (30, 32; 30a, 32a) at the end of the respective extension (30, 32; 30a, 32a).

In some embodiments, there are ultrasonic sensors (12, 14; 12a, 14a) at the end of the extensions (30, 32; 30a, 32a).

BRIEF DESCRIPTION OF THE DRAWINGS

Teachings of the present disclosure are further explained below with reference to the drawings. Corresponding subject matter or elements are denoted by the same reference signs in all of the figures, wherein.

Figure 1:
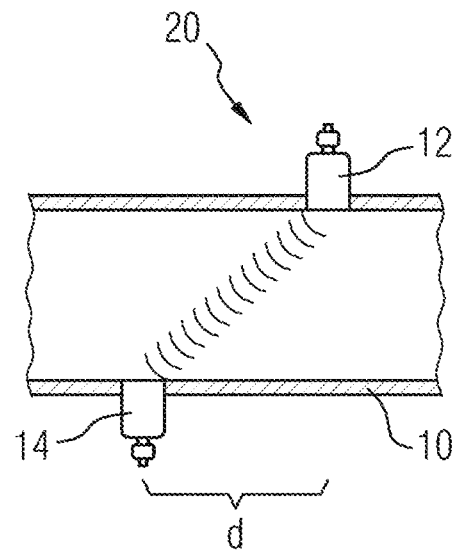
FIGS. 1-3 are drawings showing an illustration of a concept for measuring a flow speed of a medium flowing through a conduit, using ultrasound technologies.

DETAILED DESCRIPTION in the case of a flow meter having at least two sensors which are arranged at a distance from one another, the flow meter can be placed between two tube segments of a conduit by means of a ring-shaped carrier part. The ring-shaped carrier part is intended or designed to be mounted on a flange face of a tube section of the conduit. The sensors are located in each case at a free end of an extension extending from the ring-shaped carrier part. The extensions are aligned perpendicularly or at least substantially perpendicularly to a plane defined by the carrier part. Two sensors in each case define a signal path and the signal path comprises a component perpendicular to the plane defined by the carrier part.

The flow meter with its carrier part may be mounted as a seal between the ends of two tube segments or hose segments, referred to here and below simply as tube segments. In the mounted state, the extensions project into at least one of the tube segments. In the case of extensions which point in the same direction starting from the carrier part, said extensions project into one of the tube segments. In the case of extensions which point in different directions starting from the carrier part, at least one extension projects into one of the tube segments and at least one other extension projects into the other tube segment. By virtue of the direction and/or length of the extensions, it is ensured that a signal path between the two sensors or between two respective sensors comprises a component perpendicular to the plane defined by the carrier part. This component runs parallel to the flow direction of a medium flowing through the respective tube segment. It is therefore possible to specify the flow speed of the medium by observing propagation time differences of sonic signals, in particular ultrasonic signals, as described above.

In some embodiments, the flow meter does not require or comprise a measuring tube. During the installation of the flow meter, the extensions thereof are introduced into the tube segment onto which the carrier part is mounted. The flow meter is therefore smaller and lighter than flow meters comprising a measuring tube. The carrier part has a thickness which corresponds dimensionally to a thickness of a seal. The flow meter can therefore easily be deployed in an existing conduit or hose system without having to adapt the lengths of existing lines for this purpose.

In some embodiments, in the case of exactly two sensors and correspondingly two extensions, each extension points in a different direction starting from the carrier part, while in the case of two extensions pointing in the same direction starting from the carrier part, the extensions are of different lengths. In the case of exactly four sensors and correspondingly four extensions, two sensors in each case form a sensor pair and the extensions carrying them form an extension pair. In each extension pair, either each extension then points in a different direction starting from the carrier part or, in the case of extensions pointing in the same direction, the extensions are of different lengths. In all of these embodiment variants, it is ensured that the signal path between two sensors or two respective sensors comprises a component perpendicular to the plane defined by the carrier part, such that propagation time differences can be determined as described above.

In some embodiments, the extensions are integrally formed on the carrier part. The carrier part is then manufactured from a synthetic material and can be produced in a single work cycle, for example.

In some embodiments, each sensor is embedded into the material of the extension at the end of the respective extension. The sensor is protected there against damage during the transport of the flow meter and against damage by the respective medium.

In some embodiments, the flow meter has ultrasonic sensors at the end of the extensions as sensors. The flow meter then functions as an ultrasonic flow meter.

The embodiments discussed herein do not limit the scope of the disclosure or its teachings. On the contrary, further additions and modifications are readily possible in the context of the present disclosure, in particular those which, for example by combining or adapting individual features described in connection with the general or specific description part or contained in the claims and/or drawing, may be derived by a person skilled in the art with a view to achieving the object of the invention and which lead to novel subject matter or to novel method steps as a result of combinable features.

Figure 2:
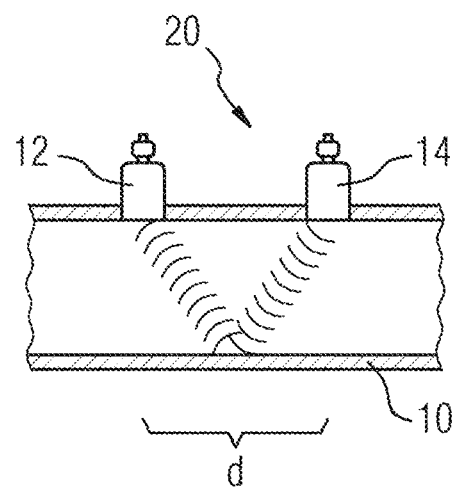
Figure 3:
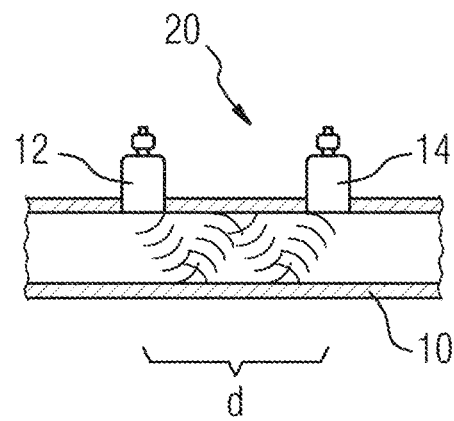

The illustrations in FIG. 1, FIG. 2 and FIG. 3 show different configurations for measuring a flow speed using ultrasound in a simplified schematic form. In these configurations, a sensor pair is assigned to a conduit 10 through which a medium whose flow speed is to be determined flows. The sensor pair comprises a first ultrasonic sensor 12 and a second ultrasonic sensor 14. The two ultrasonic sensors 12, 14, also referred to below in abbreviated form individually as sensor 12, 14 and collectively as sensors 12, 14, work as ultrasonic transmitter and ultrasonic receiver. The sensors 12, 14 are arranged at a distance from one another in a flow direction of the medium flowing through the conduit 10, in other words in an axial direction of the conduit 10.

The two sensors 12, 14 together function as a flow meter 20. Sensor signals of the sensors 12, 14 are evaluated by means of an evaluation device 22 (not shown in FIG. 1 to FIG. 3; see FIG. 4) which forms part of the flow meter 20, in order to obtain a measured value for the flow speed or a volume flow of the respective medium.

The sensors 12, 14 of the flow meter 20 are often integrated into the wall of a section of the conduit 10 or penetrate the tube wall of such a section. The conduit section then likewise forms part of the flow meter 20 and is usually referred to as a measuring tube. Such a measuring tube has a flange on each side and, for the purpose of mounting a flow meter 20, the measuring tube thereof is installed into the respective conduit 10. In an embodiment variant of a flow meter 20 without a measuring tube, the sensors 12, 14 are placed individually on the outer surface of the conduit 10.

Both sensors 12, 14 function either as transmitters or receivers of ultrasonic signals. For this purpose, each sensor 12, 14 comprises for example a piezoelectric crystal. By means of active excitation of the piezoelectric crystal, the respective sensor 12, 14 generates ultrasonic signals which are received by the other sensor 12, 14 as a result of the passive excitation of the piezoelectric crystal thereof.

In order to determine the flow speed of the respective medium, propagation time differences of ultrasonic signals which are transmitted from one of the sensors 12, 14 (first sensor 12) to the respective other sensor 12, 14 (second sensor 14) are evaluated. Specifically, the propagation time difference is observed between an ultrasonic signal that is emitted in the flow direction of the medium from the first sensor 12 to the second sensor 14 and an ultrasonic signal that is emitted against the flow direction of the medium from the second sensor 14 to the first sensor 12. The higher the flow speed, the longer the propagation time of the ultrasonic signal emitted against the flow direction of the medium and the shorter the propagation time of the ultrasonic signal emitted in the flow direction of the medium.

In order to measure such propagation time differences, a measuring section is required, in other words a distance between the at least two sensors 12, 14. The measuring section resulting from the respective distance of the sensors 12, 14 is designated d in the illustrations in FIG. 1 to FIG. 3 for the various configurations shown there. Such a measuring section renders a flow meter 20 with a measuring tube particularly unwieldy due to the space requirement. In the case of a flow meter 20 without a measuring tube, each sensor 12, 14 must be placed individually, the respective distance measured very precisely, and the evaluation device 22 parameterized according to the measured distance.

Figure 4:
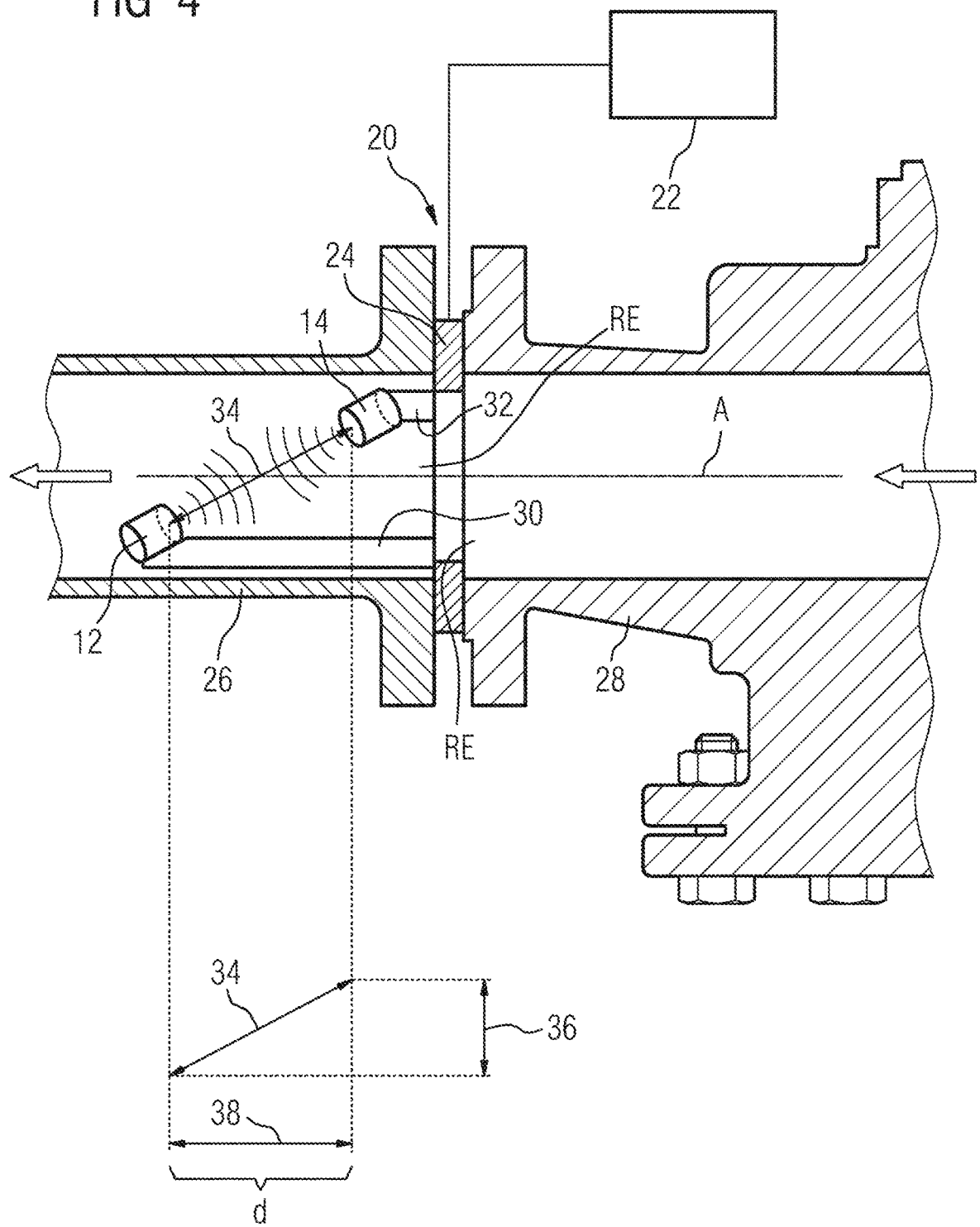
FIG. 4 is a drawing showing an example embodiment of a flow meter incorporating teachings of the present disclosure.

The illustration in FIG. 4 shows an example embodiment of a flow meter 20 incorporating teachings of the present disclosure. This can be placed between two tube segments 26, 28 of a conduit 10 by means of a flange-type ring-shaped carrier part 24, and is placed in this manner in the configuration illustrated. The respective tube end or tube segment end is designated RE. The reference sign A designates a tube axis or conduit axis. This can also be considered as an axis of symmetry of a tube or tube segment 26, 28 which is typically rotationally symmetrical. At least two finger-type extensions 30, 32 extend from the carrier part 24 perpendicularly to a plane defined by the carrier part 24. The normal to the surface of this plane thus defined typically runs parallel to the tube axis A. The extensions 30, 32 project into one of the tube segments 26, 28, specifically either each extension 30, 32 projects into one of the tube segments 26, 28 or both extensions 30, 32 project into the same tube segment 26, 28. Located at the free end of each extension 30, 32 is a sensor 12, 14, in particular an ultrasonic sensor 12, 14.

The distance that is required between the sensors 12, 14 for the flow meter 20 to function is produced by virtue of the fact that the finger-type extensions 30, 32 either point in different directions or, in the case of extensions 30, 32 pointing the same direction, are of different lengths. The expressions "different directions" and "the same direction" are defined as follows: in the case of two extensions 30, 32 pointing in the same direction, two notional vectors running in each case from the carrier part 24 to the sensor 12, 14 at the end of the extension 30, 32 are parallel or at least substantially parallel to each other and in any case encompass only a small angle (<10°). In the case of two extensions 30, 32 pointing in different directions, two notional vectors running in each case from the carrier part 24 to the sensor 12, 14 at the end of the extension 30, 32 are antiparallel or at least substantially antiparallel to each other and in any case encompass only a small angle (<10°). An alignment of the extensions 30, 32 which is not exactly parallel or antiparallel may be applicable if one of the extensions 30, 32 is or both extensions 30, 32 are intended to project into a tube segment 26, 28 which is not straight.

By virtue of the extensions 30, 32 being of different lengths and/or pointing in different directions, the distance required for propagation time measurement is produced between the sensors 12, 14, which for differentiation are referred to individually as first sensor 12 and second sensor 14 in the following. The flow meter 20 proposed here requires neither a measuring tube nor resource-intensive parameterization, because a respective distance between the sensors 12, 14 is known.

In the illustration in FIG. 4, an example embodiment flow meter 20 incorporating teachings of the present disclosure is shown with two extensions 30, 32 which point in the same direction, are of different lengths, and are aligned perpendicularly or at least substantially perpendicularly to the plane defined by the carrier part 24. The sensors 12, 14 of the flow meter 20 may comprise ultrasonic sensors and the following description continues on the basis of such an embodiment variant, though without renouncing greater generality. Any reference to an ultrasonic sensor 12, 14 is however also intended to signify a sensor which works in a frequency range other than ultrasonic.

The position of the sensors 12, 14 at the end of the extensions 30, 32 defines a signal path 34. This is illustrated again separately below the illustration of the flow meter 20. It can be seen here that the signal path 34 comprises a component 36 which is parallel to the plane of the carrier part 24 (parallel component 36) and a component 38 which is perpendicular to the plane of the carrier part 24 (perpendicular component 38). Of importance is the component 38 perpendicular to the plane defined by the carrier part 24. In the case of a flow meter 20 of the proposed type mounted on a tube segment 26, 28, this component 38 points in a flow direction of a medium flowing through the tube segment 26, 28. This component 38 therefore defines the measuring section d mentioned in the description of the illustrations in FIG. 1 to FIG. 3, and the measuring section d is also marked in FIG. 4 correspondingly.

In the case of an example flow meter 20 with extensions 30, 32 that point in different directions starting from the carrier part 24, it is evident that due to the resulting signal path 34, a component 38 defining a measuring section d is likewise produced perpendicular to the plane of the carrier part 24 and in a flow direction of the respective medium.

Figure 5:
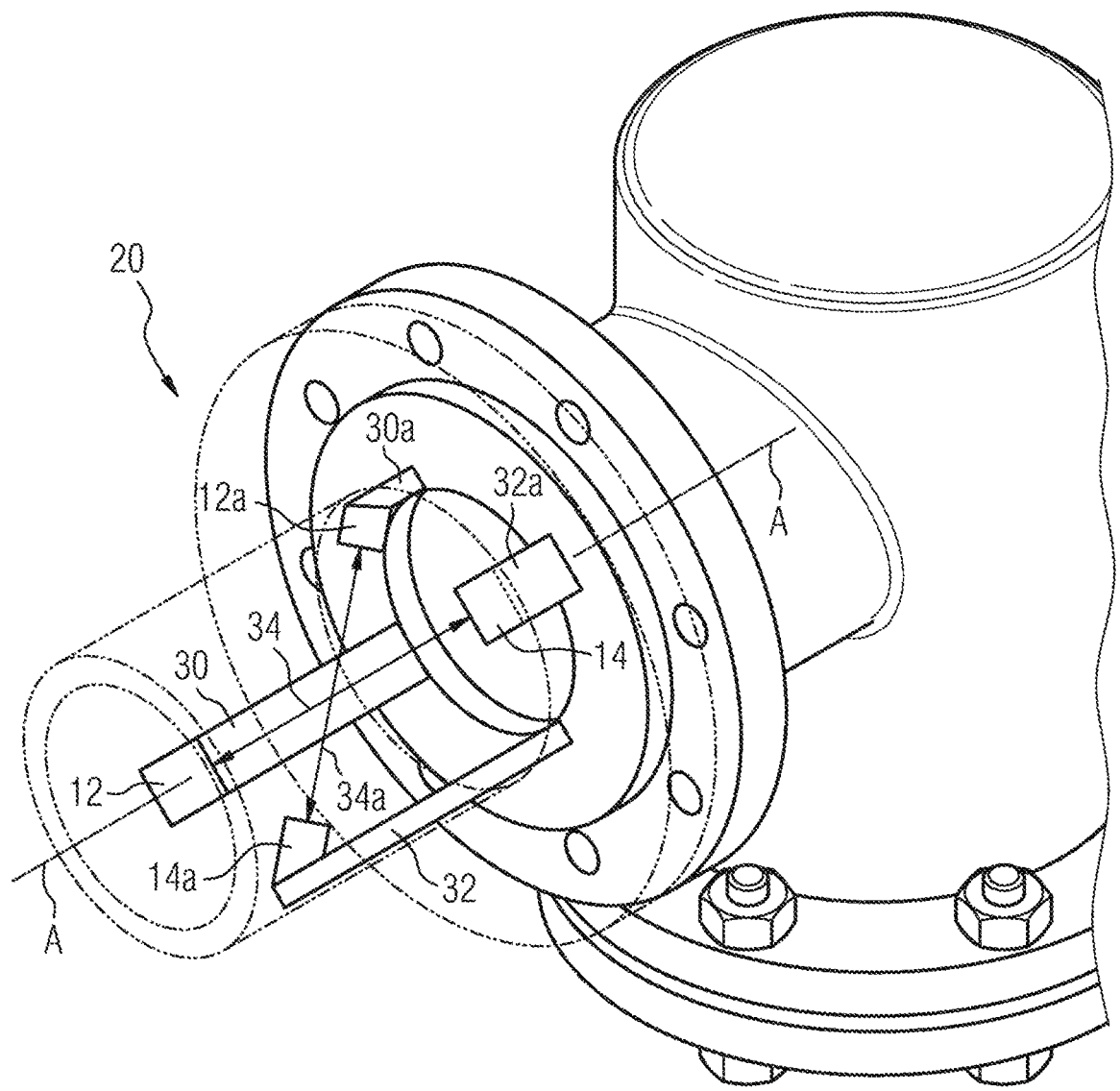
FIG. 5 is a drawing showing an example embodiment of a flow meter incorporating teachings of the present disclosure.

The illustration in FIG. 5 shows an example embodiment flow meter 20 incorporating teachings of the present disclosure according to FIG. 4. This flow meter 20 likewise requires neither measuring tube nor resource-intensive parameterization. In contrast with the flow meter 20 according to FIG. 4, which comprises two extensions 30, 32, in other words a pair of extensions 30, 32, the flow meter 20 according to FIG. 5 comprises two pairs of extensions 30, 32; 30a, 32a. At the end of each extension 30, 32; 30a, 32a is located a sensor 12, 14 in each case. The flow meter 20 according to FIG. 5 therefore also has, in addition to two pairs of extensions 30, 32; 30a, 32a, two pairs of interrelated sensors 12, 14; 12a, 14a. The course of the ultrasonic waves between the sensors 12, 14; 12a, 14a is shown by dual-headed arrows in each case (first signal path 34; second signal path 34a).

In the case of extensions 30, 32; 30a, 32a which point in the same direction, at least at a specific time point, in one of the two sensor pairs the ultrasonic waves are emitted by the first sensor 12 located at the end of the long extension 30 and are received by the second sensor 14 located at the end of the associated short extension 32. In the other sensor pair, the ultrasonic waves are emitted by the second sensor 14a located at the end of the short extension 32a and are received by the first sensor 12a located at the end of the associated long extension 30a. In the case of extensions 30, 32; 30a, 32a which point in different directions, this applies correspondingly. Instead of the long and short extensions 30, 32;

30a, 32a, one extension pair 30, 32; 30a, 32a points in the same direction in each case. The two extension pairs 30, 32; 30a, 32a point in opposite directions.

The embodiment shown in FIG. 5 provides that ultrasonic waves are emitted by one sensor pair 12, 14 in the flow direction of the respective medium at the same time as ultrasonic waves are emitted by the other sensor pair 12a, 14a against the flow direction of the medium. In the case of the embodiment variant shown in FIG. 4 with only one sensor pair 12, 14, ultrasonic waves are initially emitted by the first sensor 12 and received by the second sensor 14, and in an alternating manner are subsequently emitted by the previously receiving second sensor 14 and received by the previously emitting first sensor 12. In this case likewise, the ultrasonic waves generated in each case are emitted once in the flow direction of the flowing medium and once against the flow direction of the flowing medium. In the case of a flow meter 20 having only one sensor pair 12, 14 (FIG. 4), a complete cycle (transmit with the first sensor 12, receive with the second sensor 14; transmit with the second sensor 14, receive with the first sensor 12) must elapse in order to obtain a flow measurement value. In the case of a flow meter 20 having two pairs of interrelated sensors 12, 14; 12a, 14a, the flow measurement value can be determined as soon as the two sensors 12, 14; 12a, 14a which function as receivers receive the ultrasonic waves that are emitted in each case.

In the case of the embodiment variant shown in FIG. 5, it is similarly not essential for the direction of the ultrasonic waves emitted in each case to remain constant. By changing the direction of the respectively emitted ultrasonic waves in the case of an embodiment variant having two sensor pairs 12, 14; 12a, 14a, applying a periodicity which is or can be predetermined, it is possible to prevent or at least reduce measuring errors due to turbulence in the flowing medium or the like.

In some embodiments, flow meter 20 has at least one sensor 12, 14 which simultaneously or alternately emits in two directions and receives from two directions, such that instead of two sensor pairs comprising four sensors 12, 14; 12a, 14a in total, it is also possible to produce a flow meter 20 having three sensors, including one such sensor. However, such a sensor ultimately represents merely a combination of two sensors respectively emitting in a direction and receiving from this direction, and therefore such a sensor is also considered as being two individual sensors 12, 14; 12a, 14a located at that position.

Although the invention is illustrated and described in detail with reference to the exemplary embodiments, the scope of the disclosure is not restricted by the example or examples disclosed in the foregoing, and other variations may be derived therefrom by a person skilled in the art without departing from the scope of the teachings herein.

In some embodiments, a flow meter 20 includes at least two sensors arranged at a distance from one another 12, 14; 12a, 14a, wherein said flow meter 20 does not comprise a measuring tube which is often otherwise required. The sensors 12, 14; 12a, 14a of the flow meter 20 are located in each case at a free end of an extension 30, 32; 30a, 32 that extends from a ring-shaped carrier part 24 which is intended to be mounted on a flange face of a tube section. The sensors 12, 14; 12a, 14a may be ultrasonic sensors 12, 14; 12a, 14a. The extensions 30, 32; 30a, 32a are aligned perpendicularly or at least substantially perpendicularly to a plane defined by the carrier part 24. Two sensors 12, 14; 12a, 14a (first sensor 12, 12a, second sensor 14, 14a) in each case define a signal path 34, 34a for a signal, in particular an ultrasonic signal, that is emitted by the first sensor 12, 12a and received by the second sensor 14, 14a (or vice versa). The signal path 34, 34a comprises a component 38 perpendicular to the plane defined by the carrier part 24. In an assembled state on a tube segment 26, 28, this component 38 is parallel to the flow direction of a medium flowing through the tube segment 26, 28, and therefore it is possible by means of the flow meter 20 to determine propagation time differences of a signal that is emitted against the flow direction and in the flow direction by the at least two sensors 12, 14; 12a, 14a, in order thereby to ascertain a flow speed of the medium.

LIST OF REFERENCE SIGNS

10 Conduit
12, 12a Sensor
14, 14a Sensor
20 Flow meter
22 Evaluation device
24 Carrier part
26 Tube segment
28 Tube segment
30, 30a Extension
32, 32a Extension
34, 34a Signal path
36 Parallel component
38 Perpendicular component
A Tube axis, conduit axis, axis of symmetry
d Measuring section
RE Tube end

What is claimed is:

1. A flow meter comprising:
at least two sensors arranged at a set distance from one another; and
a ring-shaped carrier configured to mount the flow meter between two tube segments of a conduit on a flange face of a tube section of the conduit;
wherein the at least two sensors are located at respective free end of an extension extending from the ring-shaped carrier part;
the extensions are aligned substantially perpendicularly to a plane defined by the carrier part;
the at least two sensors define a signal path; and
the signal path comprises a component perpendicular to the plane defined by the carrier part.

2. The flow meter as claimed in claim 1, comprising exactly two sensors; and
two extensions, wherein each of the two extensions points in a different direction starting from the carrier part.

3. The flow meter as claimed in claim 1, comprising exactly four sensors; and
four extensions;
wherein the four sensors respectively form two sensor pairs and the respective extensions carrying one of the two sensor pairs form an extension pair; and
in each extension pair, either each respective extension points in a different direction starting from the carrier part or, points in a single direction and has a different respective length.

4. The flow meter as claimed in claim 1, wherein the extensions are integrally connected to the carrier part.

5. The flow meter as claimed in claim 1, wherein each sensor is embedded into the material of the extension at the end of the respective extension.

6. The flow meter as claimed in claim 1, further comprising ultrasonic sensors at the end of each respective extension.

7. The flow meter as claimed in claim 1, comprising exactly two sensors; and
 two extensions pointing in a single direction starting from the carrier part;
 wherein the two extensions each have a different respective length.

* * * * *